United States Patent
Voight

[15] 3,684,419
[45] Aug. 15, 1972

[54] SCREEN CHANGER FOR EXTRUDERS
[72] Inventor: Bradford R. Voight, 174 Morse Road, Sudbury, Mass. 01776
[22] Filed: Jan. 25, 1971
[21] Appl. No.: 109,371

[52] U.S. Cl. .................425/192, 146/174, 425/196
[51] Int. Cl. ..............................................B29f 3/00
[58] Field of Search .18/12 B, 125 E, 13 W, DIG. 16; 146/174; 264/169

[56] References Cited

UNITED STATES PATENTS

| | | | |
|---|---|---|---|
| 2,184,177 | 12/1939 | Burrell | 18/13 W |
| 2,661,497 | 12/1953 | Birmingham | 18/12 B |
| 2,838,084 | 6/1958 | Samler | 18/12 B X |
| 3,007,199 | 11/1961 | Curtis | 18/12 B |

FOREIGN PATENTS OR APPLICATIONS

| | | | |
|---|---|---|---|
| 1,490,131 | 6/1967 | France | 18/12 B |
| 1,047,533 | 11/1966 | Great Britain | 18/12 B |
| 360,491 | 4/1962 | Switzerland | 18/12 B |
| 453,675 | 6/1968 | Switzerland | 18/12 B |

*Primary Examiner*—R. Spencer Annear
*Attorney*—John E. Toupal

[57] ABSTRACT

An automatic screen changer for use with plastic extruder machines and utilizing hydraulic pressure to provide an annular fluid seal around the screen. A control system automatically reduces seal pressure in response to actuation of a screen changing slide member.

14 Claims, 4 Drawing Figures

Bradford R. Voight
INVENTOR.

John E. Toupal
ATTORNEY.

SCREEN CHANGER FOR EXTRUDERS

BACKGROUND OF THE INVENTION

This invention relates generally to plastic extrusion apparatus, and more particularly to equipment for automatically changing filter screens in such apparatus.

Most plastic extruders employ filter screens to remove foreign matter and particles of unmelted plastic from the normal flow. The screens also break up the flow to insure a more homogeneous mixture and increase back pressure to reduce pulsations in the flow. During operation of such extruders, the screens become clogged with the residue removed from the flowing plastic. When this condition occurs, a screen must be cleaned or flow will become progressively more restricted, initially reducing efficiency and ultimately stopping operation completely.

Generally, clogged screen is replaced so as to permit continued operation while it is being replaced. Screen changing, however, is a difficult and time consuming job. Even highly skilled operators can require hours to change a single screen by hand. The head of the extruder and die assembly must be removed from the extruder, and alignment is highly critical during re-assembly. Accordingly, machine downtime associated with screen changing seriously affects the efficiency of the extrusion process.

To reduce extruder machine downtime, various types of automatic screen changer devices have been developed. Typically, these devices employ a slide member adapted for movement through the extruder body. The slide possesses a pair or screen receptacles and can be positioned so as to locate a screen retained by either receptacle in the path of flow. The other receptacle then lies outside the extruder body and is accessible to an operator. Thus, when a screen becomes clogged, the slide member is moved to an alternate position placing a clean screen in the path of flow and exposing the clogged screen. The operator is then able to remove and replace the previously clogged screen while extrusion operation continues.

Automatic screen changer mechanisms have substantially reduced extrusion machine downtime but known types have not provided entirely satisfactory performance. Although the accurately made slide members and guides permit rapid placement and alignment of new screens, the creation of effective seals around the screens remained troublesome. Typically a plurality of individual clamp devices or a threaded collar is tightened against annular sealing members surrounding the screen. This operation is relatively time consuming. In addition, since the individual clamps apply sealing forces at certain discrete points, it is difficult if not impossible to attain a uniformly tight seal about the entire periphery of the screen.

The object of this invention, therefore, is to provide a quick and efficient screen changing mechanism that will reduce extrusion machine downtime. A further object is to provide such a mechanism in which tight, uniform screen seals can be quickly made and broken

SUMMARY OF THE INVENTION

This invention is characterized by the provision of an automatic screen changer for use with plastic extrusion machines, and including a hydraulic ram for positioning a slide member in which screens are retained. A hydraulic system also is employed to create melt fluid tight seals around the peripheries of the screens. The hydraulic seal system produces fluid pressure in an annular cavity disposed concentrically with the position occupied by a screen when in use. Retained within the cavity is an annular piston that presses a sealing ring against the periphery of the screen in response to the fluid pressure. The hydraulically actuated annular piston insures the creation of uniform sealing forces and responds to variations in melt pressure caused by temperature, different flow rate, etc. In addition, seals can be quickly made and broken thereby minimizing the time required to complete a screen change.

One feature of the invention is the utilization of a plurality of ring seals on both the inner and outer surfaces of the annular piston, and the inclusion of a vent in the wall of the cavity between adjacent rings. The ring seals inhibit hydraulic fluid leakage by the piston and thereby permit the use of a higher sealing forces to create tighter seals around the screen. Hydraulic fluid leakage into the flow of plastic is prohibited completely by the vent which withdraws any fluid passing the seal rings.

Another feature of the invention is the inclusion of an automatic seal control system for a screen changer of the type described above. Upon actuation of the ram, pressure is automatically released from the seal cavity to loosen the seal and thereby allow free movement of the slide member. Upon completion of a screen change stroke by the ram, sealing pressure in the cavity is automatically restored. The advantages of this system are that required slide member actuating force is automatically reduced and the time required to complete a screen change is minimized.

DESCRIPTION OF THE DRAWINGS

Other objects and features of tHe present invention will become more apparent upon an examination of the following description taken in conjunction with the accompanying drawings wherein.

DESCRIPTION OF THE PREFERRED EMBODIMENT

Figure 1:
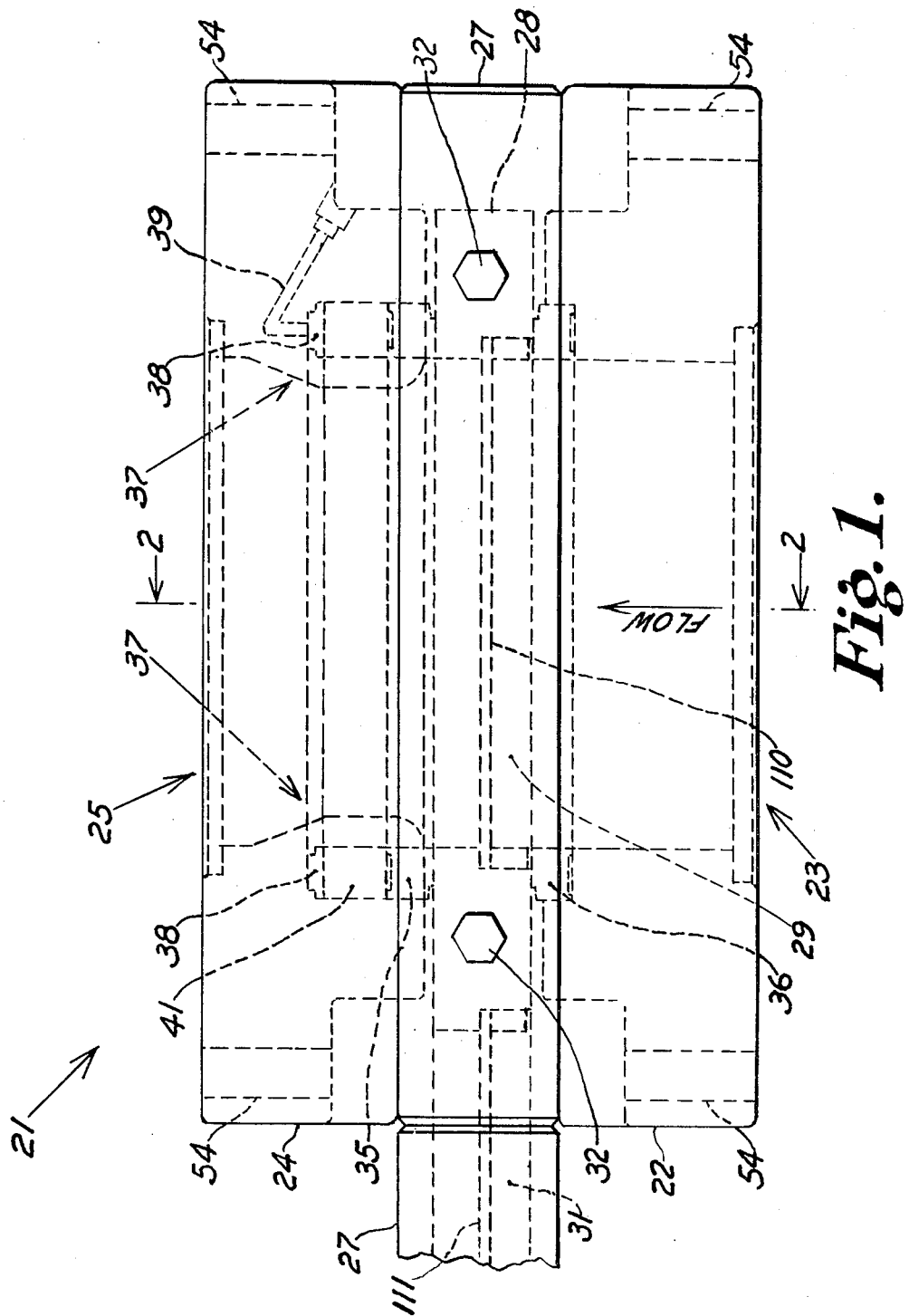
FIG. 1 is a schematic plan view of a preferred embodiment of the invention.
Figure 2:
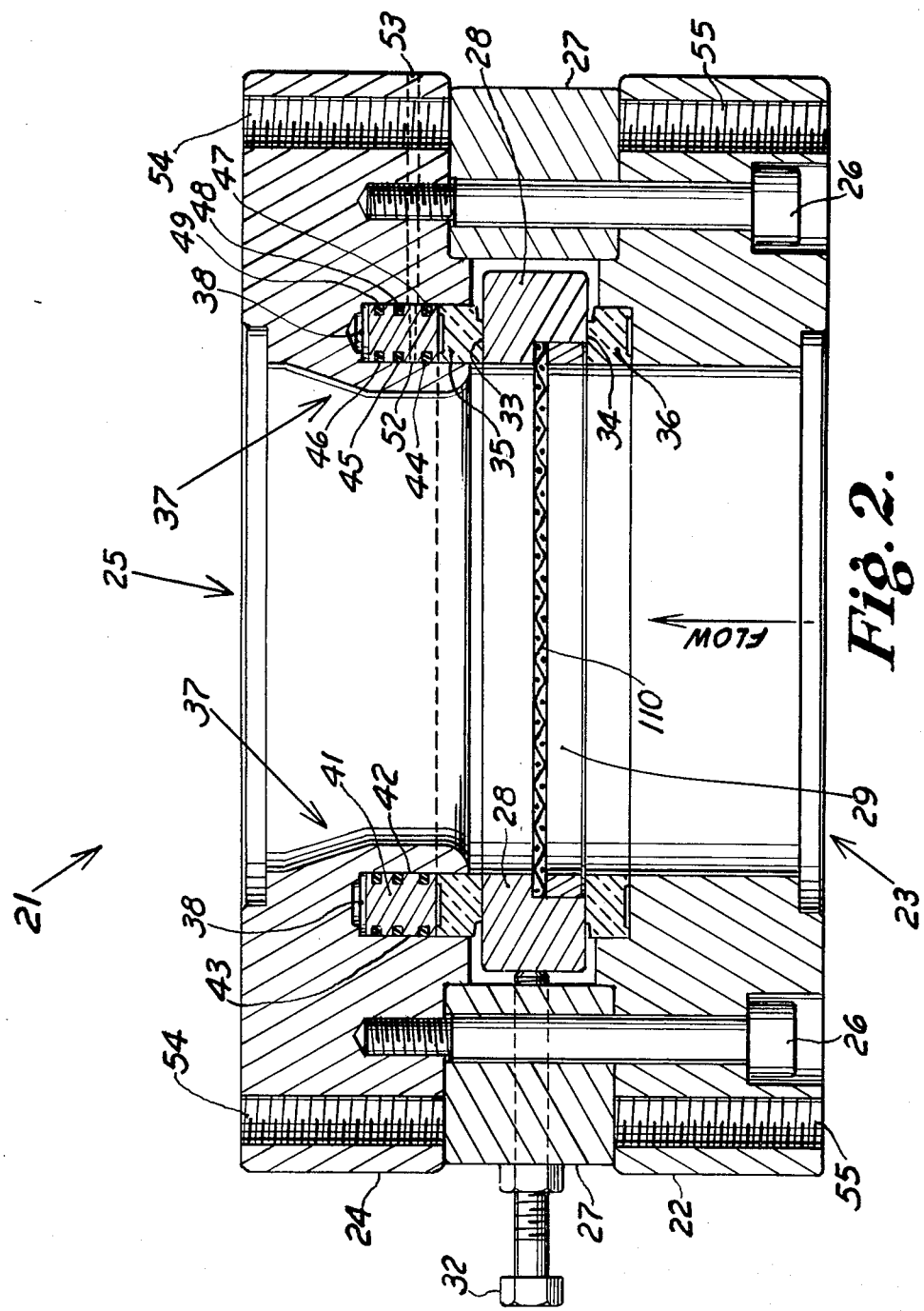
FIG. 2 is a cross-sectional view of the embodiment shown in FIG. 1 taken along lines 2—2.

Referring first to FIGS. 1 and 2 there is shown one embodiment 21 of the invention including an extruder block 22 with an inlet orifice 23 and a die block 24 with an outlet orifice 25. Body bolts 26 connect the extruder block 22 and the die block 24, and disposed therebetween are tie arms 27. A slide member 28, which defines a plurality of spaced apart openings 29, 31, passes between the tie arms 27, and is restricted to a single path of movement by guide bolts 32. In the interest of clarity only one of two or more uniformly spaced guide bolts 32 is shown. Engaging peripheral portions 33 and 34 of the slide member 28 are annular seals 35 and 36. Disposed partially within the die block 24 is a force producing system 37 comprising a hereinafter described source of fluid pressure which communicates with an annular pressure cavity 38 via an inlet channel 39. Retained within the cavity 38 is an annular piston 41 with inner and outer peripheral surfaces 42, 43 accommodating a plurality of ring seals 44–49. A channel 52 extends through the piston 41 between the ring seals 44 and 45 and a communicating vent orifice 53 extends through the body of the die block 24. Operatively coupled to the slide member 28 is a hydraulic ram described below. Holes 54 and 55 are formed, respectively, in the extruder block 22 and in the die block 24. The holes 54 and 55 receive volts (not shown) during assembly of the unit 21 between a conventional extruder and an extruder die assembly.

Figure 3:
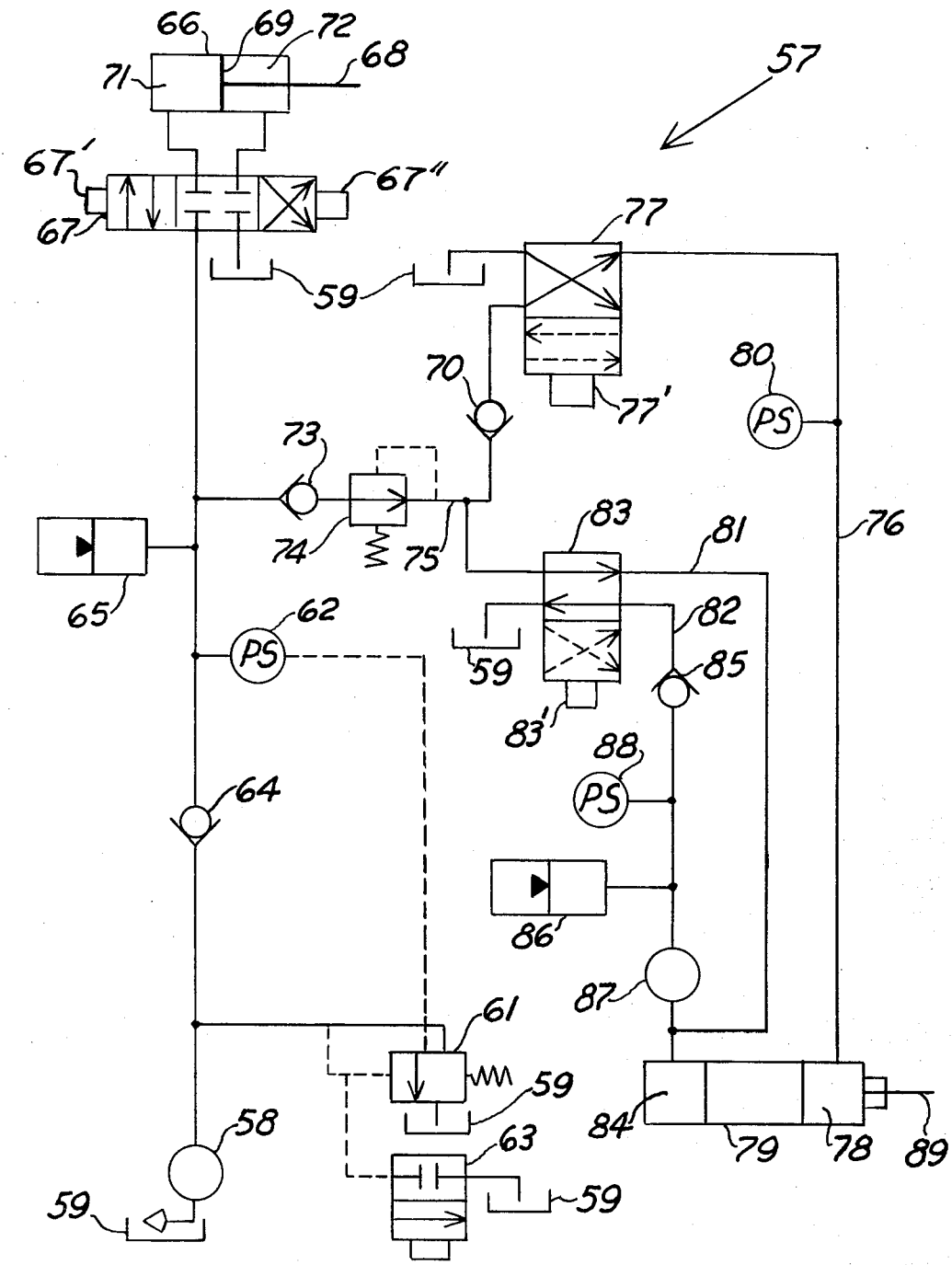
FIG. 3 is a schematic diagram of a hydraulic control system utilized in the preferred embodiment shown in FIG. 1.

Referring now to FIG. 3 there is shown a schematic diagram of a hydraulic system 57 used to control the embodiment 21 shown in FIGS. 1 and 2. A fluid pump 58, drawing hydraulic fluid from a reservoir 59, is used to produce a system pressure of, for example, 2,500 lbs. per sq. inch. Connected to the pump 58 is a pressure release valve 61, which is controlled by a pressure switch 62. Should the pressure switch 62 sense a system pressure higher than 2,500 lbs. per square inch (psi), the valve 61 is opened, thereby releasing fluid into the reservoir 59 and lowering system pressure. Conversely, if system pressure falls below 2,200 psi, switch 62 closes the valve 61, allowing the pump 58 to raise system pressure. Also connected to the pump 58 is a pilot dump valve 63 which reduces pressure to zero when the system 57 is not in use. Fluid released by valve 63 is also dumped into reservoir 59.

Fluid circulated by the pump 58 passes through a check valve 64 into the remainder of the system and into an accumulator 65. System pressure drops during operation caused by excessive fluid flow are minimized because of the accummulator 65. The pressurized fluid is circulated to a hydraulic ram 66 by a three-way switching valve 67. A shaft 68 connects the ram 66 to the slide member 28 shown in FIGS. 1 and 2. Appropriate manipulation of the valve 67 causes the shaft 68 to move in either direction, or remain stationary. Such motions are produced by a piston 69 straddled within the ram 66 by cavities 71 and 72. Depending upon the direction of motion desired, the valve 67 connects either cavity 71 or 72 to the pressurized fluid, and the other cavity is allowed to drain into the reservoir 59. If no motion of piston 69 is desired, the valve 67 isolates both cavities 71, 72 from the system, and the pressure in both cavities remains constant.

Hydraulic fluid at 2500 psi pressure also passes through a check valve 73 to a pressure reducing valve 74 that supplies fluid at, for example, 1,000 psi pressure to a line 75. Joining the line 75 to a line 76 is a check valve 70 and a two-way switching valve 77 that connects line 76 to either line 75 or to the reservoir 59. Line 76 communicates with a pressure switch 80 and an output cavity 78 of an intensifier 79. Another two-way switching valve 83 connects the line 75 to either a line 81 or a line 82 the other of which is connected to the reservoir 59. Line 81 runs to an input cavity 84 of the intensifier 79 while line 82 passes through a check valve 85 to an accumulator 86 and to the input cavity 84 through a solenoid operated valve 87. The accumulator 86 is connected also to a pressure switch 88 that deactivates the valve 61 should leakage cause the pressure in accumulator 86 to drop to, for example, below 900 psi. A line 89 runs from the output cavity 78 to the inlet channel 39 shown in FIG. 1.

Figure 4:
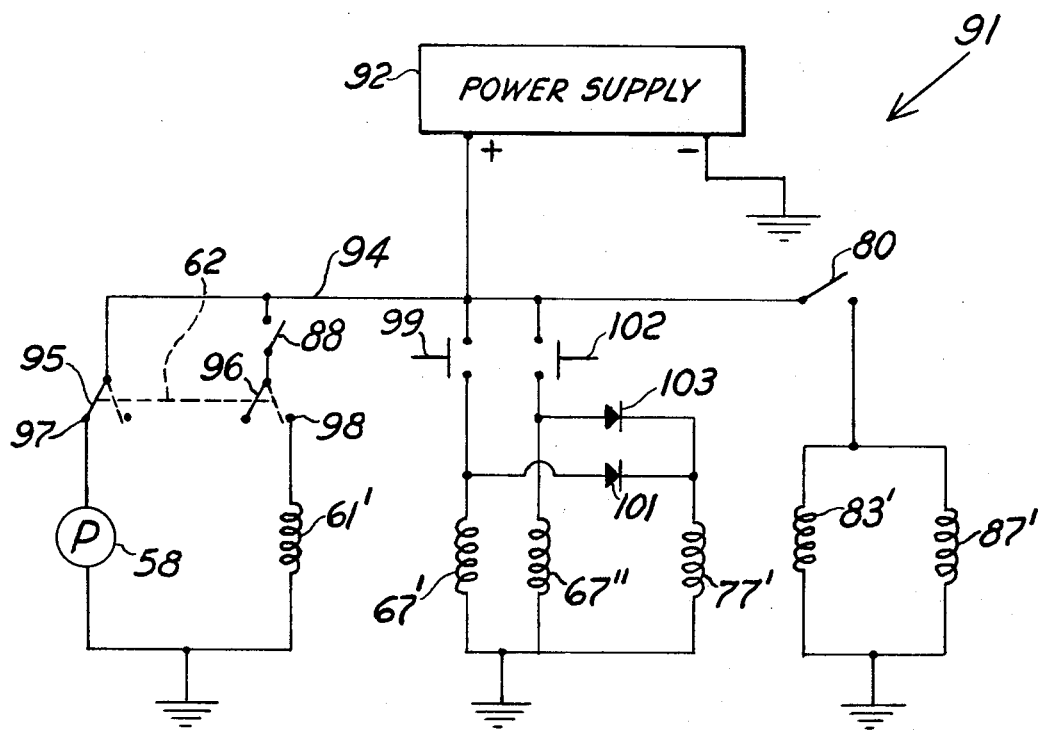
FIG. 4 is a schematic diagram of an electrical control circuit utilized in the embodiment shown in FIG. 1.

Referring now to FIG. 4, there is shown a schematic diagram of an electrical control circuit 91 utilized with the preferred embodiment 21. Each solenoid shown in the electrical circuit 91 controls a valve shown in FIG. 3 and is identified by a corresponding reference numeral to which a prime is added. A common positive buss 94 is energized by the positive output potential of a dc power supply 92. As shown the pressure switch 62, also shown in FIG. 3, is a double pole-double throw switch. One common contact 95 of the switch 62 is connected to the positive buss 94, and a common contact 96 is connected to the positive buss 94 by the pressure switch 88 also shown in FIG. 3. Contact 97 of the switch 62 is connected to the fluid pump 58, and contact 98 is connected to the valve 61 both also shown in FIG. 3. At all times the contact 95 is connected with contact 97 and the contact 96 is disconnected from the contact 98 or vice versa. That is, at all times either the valve 61 is closed and pump 58 running, or the pump 58 is off and the valve 61 open. A push button switch 99 connects the common buss 94 to a diode 101 and a solenoid 67'. Similarly, a push button 102 connects the buss 94 to a diode 103 and a solenoid 67''. The solenoid 67', when energized, moves the associated valve 67 to the right as shown in FIG. 3, and solenoid 67'', upon energization, moves valve 67 to the left. The cathode terminals of the diodes 101 and 103 are connected to a solenoid 77' so that when either push button 99 or 102 is depressed the solenoid 77' is thereby energized. A pair of solenoids 83' and 87' associated with valves 83 and 87 (FIG. 3) are connected to the common buss 104 by the pressure switch 80 also shown in FIG. 3.

Operation of the system is begun by turning on the power supply 92 to energize the buss 94. Initially, the switch 62 (FIG. 4) is in the closed position shown by solid lines since system pressure is below 2,500 psi. Therefore, pump 58 operates to raise system pressure. When pressure reaches 2500 psi the switch 62 responds by moving to the open position shown by dotted lines in FIG. 4 thereby deenergizing solenoid 61' to open the valve 61 (FIG. 3). The pressure switch 62 and valve 61 then continue to cycle maintaining system pressure between 2,200 and 2,500 psi, as described above. At the same time fluid is pumped through the valves 70, 73 and 74 and the open valve 77 to charge the output chamber 78 of the intensifier 79. This in turn establishes pressure in the cavity 38 (FIG. 2) via the line 89 and the channel 39 and forces the piston 41 into sealing engagement with the seal ring 35. When pressure in line 76 reaches 900 psi, the pressure switch 80 opens to deenergize solenoids 83' and 87' and thereby open valves 83 and 87. The resultant fluid flow through line 81 charges the input chamber 84 of the intensifier 78 which responds by providing an output pressure of, for example, 10,000 psi to the sealing cavity 38 via line 89 and channel 39. With full sealing pressure established in the cavity 38, a uniformly tight seal exists between the slide member 28 and the sealing rings 35 and 36. Accordingly, operation of the extrusion machine can be begun.

Assume next that a screen 110 retained within the opening 29 has become clogged after a period of extruder operation. To replace the screen 110, the push button 99 is depressed. Immediately the solenoid 67' is energized causing the valve 67 to move to the right as shown in FIG. 3 and allowing fluid at 2,500 psi to flow into the cavity 71 while venting the cavity 72 to the reservoir 59. The resultant actuation of the ram 66 forces slide member 28 to the right as shown in FIGS. 1 and 3. Opening 31, retaining a replacement screen 111, is therefore placed in the path of plastic flow as shown in FIG. 1 and 2. Simultaneously energized with the solenoid 67' is the solenoid 77' which moves valve 77 into the position shown dotted in FIG. 3. Therefore, fluid in the intensifier output cavity 78 is dumped into the reservoir 59 through the line 76 and the valve 77. When pressure in line 76 falls below 900 psi, the pressure switch 80 closes to energize solenoid 83' and 87'. This in turn closes the valve 87 and moves the valve 83 into the position shown dotted in FIG. 3. Consequently, fluid in input chamber 84 is dumped into the reservoir 59 trough line 81 while the fluid pressure in the accumulator 86 is retained by closed valve 87 and the check valve 85. Release of pressure in the intensifier output chamber 78 also releases pressure in the seal cavity 38 thereby reducing the force required to produce the above noted movement of the slide member 28. Upon release of the push button switch 99, the solenoid 67' is deenergized and the valve 67 returns to closed central position. Also deenergized is the solenoid 77' and the valve 77 returns to its normally open position shown by solid lines in FIG. 3. Fluid pressure is again restored to line 76 and, accordingly, to the seal cavity 38 and upon reaching 900 psi, the pressure switch 80 opens to deenergize the solenoids 83' and 87'. Thus, as described above, full fluid pressure of, for example, 10,000 psi is restored in the seal cavity 38.

After further operation, the screen 111 will in turn become clogged, and require changing. With the screen 110 having been cleaned and replaced in opening 29, the push button 102 (FIG. 4) is depressed. Valve solenoid 77' is thereby energized and normally open valve 77 moves into the closed position shown dotted in FIG. 3. Fluid in intensifier output cavity 78 is dumped through line 76 into reservoir 59. When pressure in line 76 falls below 900 psi, the pressure switch 80 closes energizing solenoids 83' and 87' to close valve 87 and move valve 83 into the closed position shown dotted in FIG. 3. This causes fluid in cavity 84 to drain through line 81 and valve 83 into the reservoir 59 while pressure is again retained in the accumulator 86 by closed valve 87 and the check valve 85. Along with the pressure in the output chamber 78 of intensifier 79, the pressure in seal cavity 38 is reduced and the seal between the rings 35, 36 and the slide member 28 is broken. Simultaneously, solenoid 67" is energized moving valve 67 into the left position as shown in FIG. 3. This produces leftward movement of the piston 69 and, accordingly, of the slide member 28 so as to return screen 110 into the path of flow. When button 102 is released, the solenoid 67" is deenergized causing valve 67 to move to its central position as shown in FIG. 3, and solenoid 77' is deenergized causing valve 77 to move into open position shown by solid lines in FIG. 3. Therefore, the intensifier output chamber 78 is again charged through line 76 and valve 77. When pressure in line 76 reaches 900 psi, the switch 80 opens to deenergize solenoid 83' and 87'. Valve 83 is thereby moved to the open position shown by solid lines in FIG. 3 and the valve 87 is opened. The input chamber 84 is again charged through line 81, creating 10,000 psi in the seal cavity 38 tightly sealing the periphery of the screen 110. Accumulator 86 stabilizes sealing pressure through the opened valve 87. The screen 111 in opening 31 is now exposed and may be removed, cleaned and replaced.

Obviously, many modifications and variations of the present invention are possible in light of the above teachings. It is to be understood, therefore, that the invention can be practiced otherwise than as specifically described.

What is claimed is:

1. Apparatus for extruding plastic materials comprising:
   a. housing means comprising extruder block means adapted for connection to an extruder and having an inlet opening for passing plastic material transmitted thereby, die block means adapted for connection to an extrusion die and having an outlet opening for passing plastic material thereto, connector means for connecting said extruder block means to said die block means so as to axially align said inlet opening with said outlet opening;
   b. slide means disposed between said extruder block means and said die block means and defining a plurality of spaced apart openings;
   c. guide means defining for said slide means a path of movement that sequentially aligns said spaced apart openings with said axially aligned inlet and outlet openings;
   d. annular seal members disposed between said slide means and each of said extruder block means and said die block means, said annular seal members being axially aligned with said inlet and outlet openings and adapted to engage peripheral portions of said slide means surrounding said openings therein;
   e. force producing means for exerting a sealing force between said slide means and said annular seal members, said force producing means comprising a source of fluid pressure, and a pressure cavity partially defined by one of said annular seal members and communicating with said source of fluid pressure.

2. Apparatus according to claim 1 wherein said force producing means further comprises a piston member movably disposed in said pressure cavity and adapted to exert said sealing force by forcibly engaging said one seal member in response to fluid pressure in said pressure cavity.

3. Apparatus according to claim 2 wherein said pressure cavity and said piston member are annular and are axially aligned with said one seal members 4. Apparatus according to claim 3 wherein said cavity is partially defined by one of said extruder block means and said die block means and said source of fluid pressure comprises an inlet channel defined thereby and communicating with an end of said cavity opposite said one seal member.

5. Apparatus according to claim 4 including a plurality of spaced apart inner ring seals disposed between a wall of said cavity and an inner wall of said annular piston member and a plurality of spaced apart outer ring seals disposed between a wall of said cavity and an outer wall of said annular piston member.

6. Apparatus according to claim 5 wherein said block partially defining said cavity further defines an inner vent orifice terminating between adjacent wall portions of said cavity and said piston member at a position between a pair of said ring seals.

7. Apparatus according to claim 1 including power actuator means for producing movement of said slide means between said extruder block means and said die block means.

8. Apparatus according to claim 7 including pressure relief means for selectively reducing the fluid pressure in said cavity.

9. Apparatus according to claim 8 including control means for automatically activating said pressure relief means to reduce the fluid pressure in said cavity in response to actuation of said power actuator means to produce movement of said slide means.

10. Apparatus according to claim 9 wherein said force producing means further comprises a piston member movably disposed in said pressure cavity and adapted to exert said sealing force by forcibly engaging said one seal member in response to fluid pressure in said pressure cavity.

11. Apparatus according to claim 10 wherein said pressure cavity and said piston member are annular and are axially aligned with said one seal member.

12. Apparatus according to claim 11 wherein said cavity is partially defined by one of said extruder block means and said die block means and said source of fluid pressure comprises an inlet channel defined thereby and communicating with an end of said cavity opposite said one seal member.

13. Apparatus according to claim 12 including a plurality of spaced apart inner ring seals disposed between a wall of said cavity and an inner wall of said annular piston member and a plurality of spaced apart outer ring seals disposed between a wall of said cavity and an outer wall of said annular piston member.

14. Apparatus according to claim 13 wherein said block partially defining said cavity further defines a vent orifice terminating between adjacent wall portions of said cavity and said piston member at a position between a pair of said ring seals.

* * * * *